(12) United States Patent
Hamid et al.

(10) Patent No.: US 7,043,061 B2
(45) Date of Patent: May 9, 2006

(54) SWIPE IMAGER WITH MULTIPLE SENSING ARRAYS

(76) Inventors: Laurence Hamid, 561 Brookridge Crescent, Ottawa, Ontario (CA) K4A 1Z3; Scott Newman Ashdown, 239 Harmer Avenue South, Ottawa, Ontario (CA) K1Y 0V5

( * ) Notice: Subject to any disclaimer, the term of this patent is extended or adjusted under 35 U.S.C. 154(b) by 631 days.

(21) Appl. No.: 10/155,005

(22) Filed: May 28, 2002

(65) Prior Publication Data

US 2003/0002719 A1 Jan. 2, 2003

Related U.S. Application Data

(60) Provisional application No. 60/306,139, filed on Jul. 19, 2001, provisional application No. 60/305,910, filed on Jul. 18, 2001, provisional application No. 60/305,186, filed on Jul. 16, 2001, provisional application No. 60/300,836, filed on Jun. 27, 2001.

(51) Int. Cl.
*G06K 9/00* (2006.01)

(52) U.S. Cl. .................. 382/124; 382/115; 73/514.32; 361/280; 324/661; 324/686

(58) Field of Classification Search ........ 382/115–127; 283/68, 69, 78; 356/71; 73/514.32; 361/280–330; 324/686, 661, 662
See application file for complete search history.

(56) References Cited

U.S. PATENT DOCUMENTS

| 4,833,724 A * | 5/1989 | Goel ........................ 382/318 |
| 5,920,063 A * | 7/1999 | Kawamoto et al. ...... 250/208.1 |
| 6,002,815 A * | 12/1999 | Immega et al. ............. 382/312 |
| 6,333,989 B1 * | 12/2001 | Borza ........................ 382/124 |
| 6,408,087 B1 * | 6/2002 | Kramer ..................... 382/124 |
| 6,643,389 B1 * | 11/2003 | Raynal et al. ............. 382/124 |
| 2003/0165261 A1 * | 9/2003 | Johansen et al. .......... 382/124 |

FOREIGN PATENT DOCUMENTS

| EP | 0 813 164 A1 | 12/1997 |
| WO | WO 98/40962 A1 | 9/1998 |
| WO | WO 98/58342 A1 | 12/1998 |

* cited by examiner

*Primary Examiner*—Bhavesh M. Mehta
*Assistant Examiner*—Aaron Carter
(74) *Attorney, Agent, or Firm*—Woodcock Washburn LLP

(57) ABSTRACT

A biometric sensing device includes sensing arrays for sensing a biological surface swiped across the sensing arrays in an arbitrary direction. This device allows for simultaneously sensing different features of a biological surface where the features have the smallest distinguishable features of different size. Using the technique of interleaving partial images, the resolution of the biometric sensing device is increased. Therefore, a small and robust biometric sensing device is provided, which allows for sensing high resolution images.

30 Claims, 5 Drawing Sheets

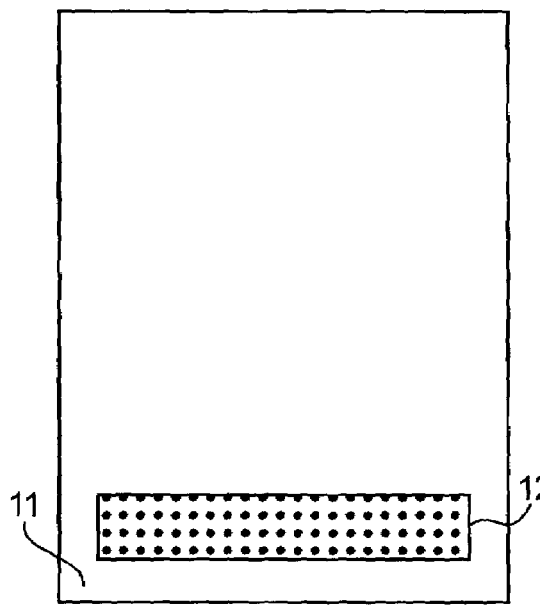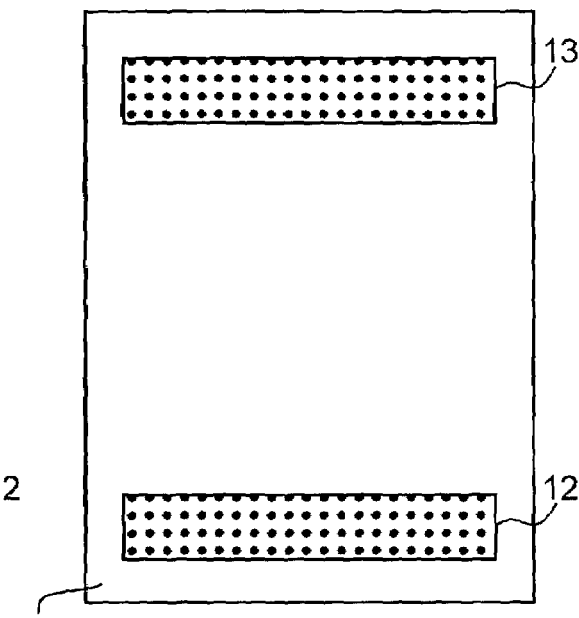
Figure 1a
(PRIOR ART)
Figure 1b
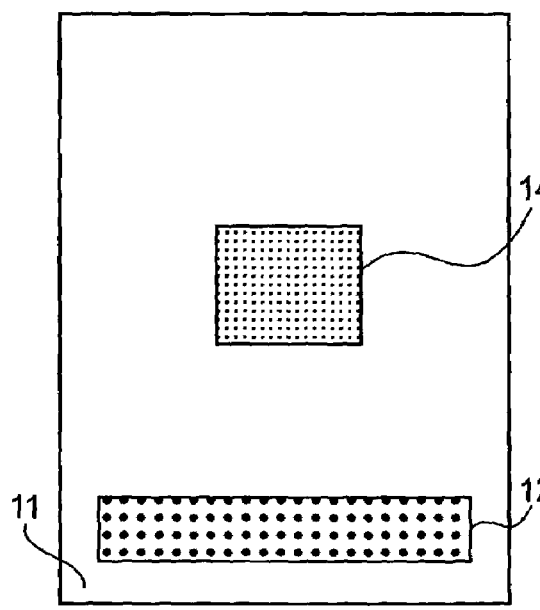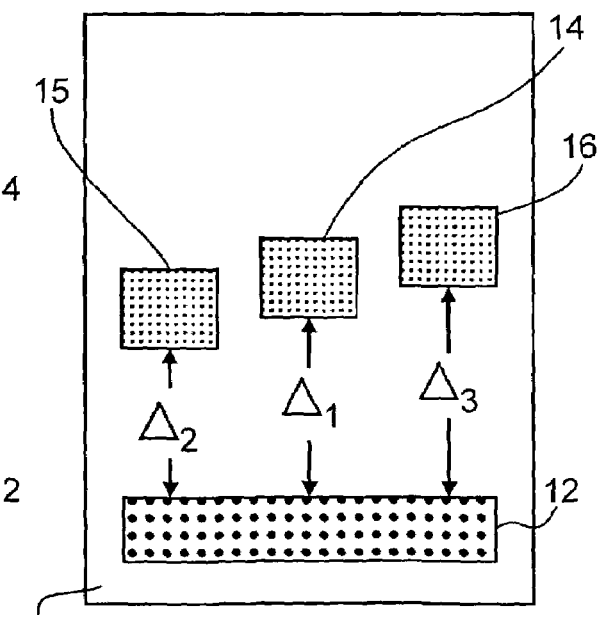
Figure 1c
Figure 1d

SWIPE IMAGER WITH MULTIPLE SENSING ARRAYS

This application claims benefit from U.S. Provisional Application Nos. 60/300,836 filed on Jun. 27, 2001; 60/305,186 filed on Jul. 16, 2001; 60/305,910 filed on Jul. 18, 2001; and 60/306,139 filed on Jul. 19, 2001.

FIELD OF THE INVENTION

This invention relates generally to imaging devices and more particular to devices suitable for identification of an individual from an examination of their fingerprint characteristics and the like.

BACKGROUND OF THE INVENTION

Fingerprint analysis is amongst the most widely used and studied biometric techniques. During the last two decades, many new and exciting developments have taken place in the field of fingerprint science, summarized for example in the monograph *Advances in Fingerprint Technology*, $2^{nd}$ ed., edited by H. C. Lee and R. E. Gaensslen (CRC Press, 2001). Fingerprint identification not only plays a major role in forensic or police science, but also in controlling the building-access or information-access of individuals to buildings, rooms, and devices such as computer terminals.

Typically in electronic fingerprint matching, a live fingerprint is scanned and electronically digitized. The digitized data generally contains information pertaining to characteristic features of the fingerprint, such as ridge endings, points of ridge bifurcation, and the core of a whorl, i.e. fingerprint minutiae. The digitized data is then compared with stored data relating to fingerprints that have been obtained previously from corresponding authorized persons, i.e. fingerprint templates. When a match is detected, within a predetermined level of security in the form of a predetermined false acceptance rate, the individual is identified and a corresponding action is performed.

In general, there are two types of errors associated with fingerprint identification. The first is false reject or Type I error, and the second is false accept or Type II error. A Type II error occurs when there are enough similarities between fingerprints of two individuals, that one is mistaken for the other. A Type I error occurs for a variety of reasons, and refers to when an individual is not identified even though the individual is an authorized user registered with the system.

It has been suggested that the underlying cause of errors in fingerprint analysis is that the amount of data from a fingerprint is too limited for it to be used in a biometric identification system involving a large number of users. Typically, there are only 30 to 40 minutia points available in a fingerprint. Alternatively, poor performance of fingerprint verification systems is attributed to the fact that the final verification decisions are based upon comparisons of small isolated regions of the fingerprint, when in fact a small sampling of the ridges does not provide enough detail to accurately verify or identify an individual.

One way to increase the accuracy of fingerprint identification is to include the analysis of pores within the ridges of the fingers, such as sweat pores. Pores are naturally occurring physical characteristics of the skin, which have conventionally been ignored in biometric identification. However, a typical finger contains about 50 to 300 pores, each of which varies in size and shape, and that is used in combination with other pores and pore locations for uniquely identifying an individual. Furthermore, the analysis of pore prints generally obviates the fraudulent problems encountered with fingerprint identification, since latent fingerprints do not generally contain a lot of detail about pore size, shape and/or distribution. Consequently, the use of latent fingerprints, which often fools most fingerprint identification systems, does not deceive pore print identification systems.

In a paper entitled Automated *System for Fingerprint Authentication* (*Proc. SPIE* 1994, 2277, 210–223), Stosz et al. describe a novel technique for automated fingerprint authentication, which utilizes pore information extracted from live scanned images. The position of the pores on the fingerprint ridges is known to provide information that is unique to an individual and is sufficient for use in identification. By combining the use of ridge and pore features, a unique multilevel verification/identification technique has been developed that possesses advantages over systems employing ridge information only. An optical/electronic sensor capable of providing a high resolution fingerprint image is required for extraction of pertinent pore information, which makes it unlikely that electronically scanned inked fingerprints would contain adequate pore data that is sufficient, or consistent enough, for use in authentication. The feasibility of this technique has been demonstrated by a working system that was designed to provide secure access to a computer. Low Type I error rates, and no Type II errors have been observed based on initial testing of the prototype verification system. It has been suggested by Stosz et al. that a high-resolution scanner of at least 800 DPI or greater is required to accurately resolve pores.

U.S. Pat. No. 5,982,914 to Lee et al. issued Nov. 9, 1999, discloses a method of identifying an individual using an analysis of both pore locations and minutia data. The method comprises obtaining from an individual during a registration process, a fingerprint image having at least one registration pore and at least one registration macrofeature, that is a ridge or minutia. In a bid step, a fingerprint image having at least one bid pore and at least one bid macrofeature is obtained. Bid associated data is compared to the registration associated data to produce a correlation score, wherein a successful or failed identification is obtained based on comparison of the correlation score to a predetermined threshold value. In the teachings of Lee et al. the analyses were accomplished using a commercially available 500 DPI resolution scanner.

Although the prior art clearly benefits from pore print technology, it does not truly exploit the advantages of pore print identification. Specifically, in the system disclosed by Lee et al. the commercially available 500 DPI resolution scanner is not able to extract pore detail relating to the size and shape of the pores. In fact, the teachings ignore the detailed pore morphology and concentrate on pore distribution with respect to fingerprint minutiae. As a result, this system incurs many of the same limitations as conventional fingerprint identification systems. Specifically, the individual must have an undamaged fingerprint, the imaging device must be able to acquire a full fingerprint image (i.e., a surface area of approximately 3×2 $cm^2$ size), and the individual must precisely align the predetermined finger or thumb in a manner that allows a proper matching. In the system disclosed by Stosz et al. the high-resolution scanner, which is large, bulky, expensive, and difficult to manufacture, is the greatest disadvantage.

It has now been found that it is only necessary to scan a small sampling area of a live pore print for comparison to a portion of the stored pore print template, since pores, unlike fingerprint minutiae, are distinguishable from much smaller cross-sections. For example, if there are typically only 30 to 40 minutia points available from a fingerprint covering an area of approximately 2×1 cm², then an imaging device with a scanning area one quarter of that size statistically captures a quarter of the minutia points. Clearly, it would be highly inaccurate to base a biometric identification system on such a small amount of information. Furthermore, it is highly unlikely that the characteristic minutiae, for example the core of the whirl, would be captured with a small sensor due to inconsistent sampling methods. In pore print analysis, the size, shape and location of the pores all contribute detailed information, thus increasing the accuracy of the biometric identification system and allowing a smaller scanning area to be used. In addition, the large number of pores typically available in a small cross-section of skin further contributes to the accuracy when sampling a smaller cross section. The difficulties in fingerprint analysis associated with inconsistent sampling methods are not a problem in pore print analysis, since any portion of the pore print is used to characterize the individual i.e., there is no need to capture localized minutiae as required in fingerprint analysis. Often, pore print registration provides a suitable cross-section of pores for characterization on a first attempt.

However, when only small regions of a fingerprint are sensed, difficulties of a different nature arise. Although the partial pore print provides sufficient information for identifying an individual by establishing that the scanned fingerprint is identical to one of the template fingerprints, this identification process is costly in processing time and processing resources, due to the high number of permutations needed when comparing the sensed profile with partial master profiles. The high number of permutations also adds a degree of uncertainty to the identification process. As a consequence, the type II error rate increases, requiring a less stringent predetermined false acceptance rate. It would be advantageous to have supporting information available, assisting in the step of selecting partial pore print patterns from the template database, which are likely candidates to provide a positive match with the scanned pore print profile.

Also, when scanning a series of partial areas of the fingerprint, a method that is described in U.S. Pat. No. 6,333,989 to Borza issued Dec. 25, 2001, it is important that the finger moves in a defined motion across a sensing pad. When the sensing pad is constructed such that it requires a fingertip to move in one particular direction, deviations from the optimal scan direction reduce the amount of information gathered during the scanning process, and complicate the identification process.

It would be advantageous to have a device at one's disposal, which, although utilizing the technique of partial area scanning, does not posses an inherent directional dependence on the direction of movement of the fingerprint to be imaged.

It would be of further advantage when the partial images recorded during a fingerprint scan cover the area of a fingerprint as complete as possible, so as to provide a maximum of information, as to establish the use of low false acceptance rates.

It would also be advantageous to provide a device that is small, robust, and cost efficient, and at the same time allowing to record high resolution images.

OBJECT OF THE INVENTION

It is therefore an object of the present invention to provide a biometric sensing device having a plurality of sensing arrays for sensing a biological surface swiped across said sensing arrays in an arbitrary direction.

It is another object of the present invention to provide a biometric sensing device having a plurality of sensing arrays for simultaneously sensing different features of a biological surface, said features having smallest distinguishable features of different size.

It is yet another object of the present invention to provide a biometric sensing device, wherein the resolution of the biometric sensing device is increased using the technique of interleaving partial images.

It is also an object of the present invention to provide a biometric sensing device that is small and robust while at the same time allowing for sensing high resolution images.

SUMMARY OF THE INVENTION

In accordance with an aspect of the present invention, there is provided a biometric sensing device having a sensing pad for accepting a biological surface, said sensing pad having a plurality of sensing elements, said plurality of sensing elements forming sets of rows and sets of columns, said rows and said columns each having at least two sensing elements, each two of said rows and each two of said columns being individually spaced from each other, said rows and said columns grouped together to form at least one linear sensing array, the biometric sensing device comprising a first linear sensing array, the linear sensing array being regularly spaced and having a first known spacing between rows thereof, and a second linear sensing array, the linear sensing array being regularly spaced and having a second known spacing between rows thereof, wherein a third spacing between the first and second regularly spaced linear sensing array is other than an integer multiple of the first known spacing.

In accordance with an aspect of the present invention, there is further provided a biometric sensing device having a sensing pad for accepting a biological surface, said sensing pad having a plurality of sensing elements, said plurality of sensing elements forming sets of rows and sets of columns, each of said rows and each of said columns being individually spaced and including at least two sensing elements, said rows and said columns grouped together to form at least one linear sensing array, the biometric sensing device comprising a first linear sensing array for extending across the width of a biometric surface when disposed perpendicular thereto, and a second linear sensing array for other than extending across the width of the biometric surface when the first array is disposed perpendicular thereto.

In accordance with another aspect of the present invention, there is also provided a method for sensing a biological surface comprising the steps of moving a biological surface across a sensing pad, sensing a first plurality of partial images using a first linear sensing array, sensing a second plurality of partial images using a second linear sensing array, constructing an image of the biological surface from the pluralities of partial images using a processor, and comparing the image of the biological surface with a template image.

BRIEF DESCRIPTION OF THE DRAWINGS

Exemplary embodiments of the present invention will now be described in conjunction with the following drawings, in which similar reference numbers designate similar items:

FIG. 1a is a simplified block diagram of a prior art sensing device showing a sensing pad comprising a linear capacitive sensing array;

FIG. 1b is a simplified block diagram of a capacitive biometric sensing device featuring a sensing pad comprising two linear capacitive sensing arrays each having a same resolution;

FIG. 1c is a simplified block diagram of a capacitive biometric sensing device featuring a sensing pad comprising two linear capacitive sensing arrays each having a different resolution;

FIG. 1d is a simplified block diagram of a capacitive biometric sensing device featuring a sensing pad comprising a first and three other linear capacitive sensing arrays, the three other linear capacitive sensing arrays individually spaced away from the first linear capacitive sensing array;

FIG. 2b is a schematic representation of biometric features imaged using the sensing device of FIG. 2a;

DETAILED DESCRIPTION OF THE INVENTION

Figure 2A:
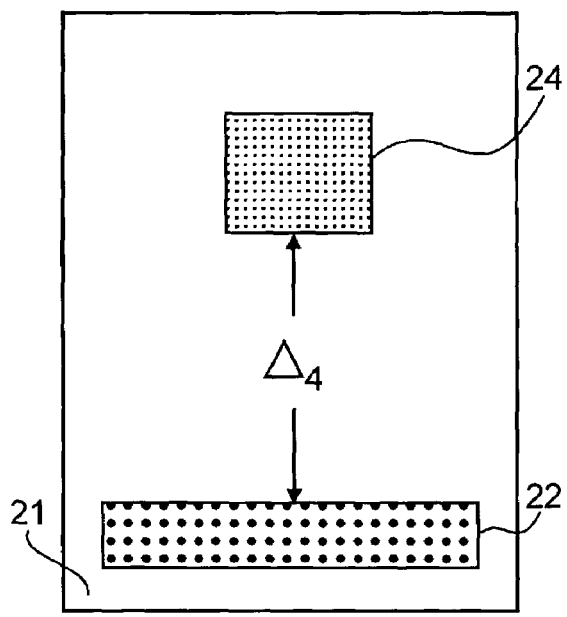
FIG. 2a is a simplified block diagram of a capacitive biometric sensing device featuring a sensing pad comprising two linear capacitive sensing arrays each having approximately the same number of sensing elements, and each having a different resolution.

An exemplary capacitive contact imager driver circuit is described in U.S. Pat. No. 5,778,089 to Borza issued Jul. 7, 1998 and incorporated herein by reference. An exemplary swipe fingerprint scanner is described in U.S. patent application Ser. No. 09/984,354, incorporated herein by reference.

According to the prior art, a contact imager comprises a group of sensor elements comprising r rows (1 to r) with c sensing elements or columns (1 to c) in each row. Optionally, the sensing elements are individually spaced. In practice there are about 300 rows and 200 columns of regularly spaced elements occupying an area of approximately 2×3 cm$^2$. This area is for accepting a fingertip for scanning. The sense elements comprise a charge sensing electrode and an amplifier circuit wherein the amplifier circuit amplifies voltage induced in the sensing electrode by a biological source, for example a fingertip. Unfortunately, larger sensing areas for contact imagers have many drawbacks. They are more fragile and therefore more subject to failure; they are more costly; and they require more space and more energy to operate effectively.

Turning to problems of pore print analysis, different limitations are associated with systems that are intended for performing such an analysis. Of course, high-resolution images are essential for comparison in order to perform a pore print analysis successfully. A user provides a predetermined biological surface, for example a right thumb, to a high-resolution scanner in order to record a high-resolution reference pore print or template. The high-resolution scanner that is used to obtain the reference pore print must be large enough to capture an image of the entire biological surface. Unfortunately, large high-resolution scanners are very expensive.

Another form of contact imager is a swipe imager. In the swipe imager, a biometric information source is passed over an imager and data is recorded during the motion of passing over. Such an imager requires a far smaller array of imaging elements. As an example, a swipe imager comprises 30 rows by 200 columns resulting in a contact imager of approximately $\frac{1}{10}^{th}$ of the area of the prior art device. Problematically, swipe fingerprint imagers are subject to reproducibility difficulties and are more prone to errors due to dryness or wetness of, for example, fingertips.

According to the present invention, the sense elements are arranged as to form individual linear capacitive sensing arrays within a same sensing pad. Within each linear capacitive sensing array the rows are equally spaced by a given row spacing, and the columns are equally spaced by a given column spacing. Each linear sensing array has a capacitive detective area and a resolution, depending on an area and a number of rows and columns forming the linear capacitive sensing array. In practice there are about 10 rows and 200 columns of regularly spaced elements, occupying an area of approximately 0.1×2 cm$^2$, in a representative linear capacitive sensing array. The sensing element density of the linear capacitive sensing array, which is inversely proportional to the row spacing and the column spacing of the linear capacitive sensing array, determines the resolution of the linear capacitive sensing array. Sensing elements are sized and disposed in such a fashion that they are capable of distinguishing the smallest desired feature of a fingerprint. The placement and spacing of the sensor elements allow an image of a fingerprint, once scanned, to contain sufficient features for analysis. Preferably, in order to generate an image for analysis, a sensing element is smaller than half the smallest feature size to be sensed.

As a biological surface such as a fingertip is passed across the individual linear capacitive sensing arrays, successive rows across the fingertip are imaged. A processor is used to correlate data received from different linear capacitive sensing arrays, with each other and with previously stored sample data. The charge induced in the charge sensing electrodes roughly depends on the separation of the biological surface from the charge sensing electrodes, and is therefore different for ridges and troughs of a fingerprint structure, as well as for fingerprint pores. Thus, the scanning techniques as disclosed in U.S. Pat. No. 5,778,089 to Borza, issued Jul. 7, 1998, and in U.S. Pat. No. 4,353,056 to Tsikos, issued Oct. 5, 1982, not only allow for sensing of the fingerprint minutiae, but also, when individual sensing element size is appropriate, allow for sensing of the pore profile.

Referring to FIG. 1a, a simplified block diagram of an exemplary imaging device according to prior art is shown.

A sensing pad 11 comprises a linear capacitive sensing array 12. The sensing pad has an area of approximately 3×2 cm² for accepting a fingertip drawn across the sensing pad. In this example, the linear capacitive sensing array 12 comprises 10 rows and 300 columns. The linear capacitive sensing array 12 is connected through an analog switch matrix to facilitate reading of the image of a biological surface. Timing and sequencing logic selects each element in the array, in turn, to produce a complete image of a fingerprint presented to the device. The output signal is directly sent as an analog signal or, alternatively, is converted to a digital signal prior to output from the device. A processor, which receives the data from the linear capacitive sensing device, constructs a series of partial snapshots of the fingerprint. The individual images have a sensing time difference τ, which is determined by the timing and sequencing logic. A reconstruction of an image representative of the biological surface scanned is based on finding overlapping areas between captured images; the reconstruction is achieved for example in a puzzle-like fashion.

The resolution of the imaging device is determined by the sensing element density. As will be apparent to one of skill in the art, by modifying the space between consecutive rows, the resolution of the imaging device is inversely modified. Therefore, the resolution is doubled, when the row spacing is reduced to half of its original value. With this small size, it is possible that a fast moving fingertip will provide image data for non-overlapping portions thereof, which is generally considered undesirable. Alternatively, the imager is provided with a very high bandwidth to support rapid image sensing, thereby increasing its cost, signal to noise and/or power consumption.

Referring now to FIG. 1b, a simplified block diagram of an imaging device according to a first preferred embodiment of the present invention is shown. The sensing pad 11 comprises two linear capacitive sensing arrays 12 and 13. Both arrays comprise the same number of sensing elements, arranged in the same number of rows and the same number of columns. As an example, both linear capacitive sensing arrays comprise 10 rows and 200 columns. The row spacing of the first linear capacitive sensing array 12 is given as $\delta_1$. The second linear capacitive sensing array 13 is spaced away from the first array 12 by a spacing of $(N+\frac{1}{2})\cdot\delta_1$, N being an integer. Both linear capacitive sensing arrays 12 and 13 are connected to the processor.

By providing a space other than an integral multiple of the row spacing $\delta_1$, the regular pattern of sensing a biological surface is also modified such that in image reconstruction accurate alignment is now possible on the row and on the half row. Thus, an image of the biological surface is capable of being reconstructed with twice the resolution: one times the resolution on the row boundary and one times the resolution on the half row boundary when interleaved provides twice the resolution. However, the disadvantages described above relating to a decrease in surface area are obviated when the two linear capacitive sensing arrays are irregularly spaced.

In FIG. 1c, a simplified block diagram of an imaging device according to a second embodiment of the present invention is shown. The sensing pad 11 comprises two linear capacitive sensing arrays 12 and 14, which now have a different number of sensing elements. In this example, the linear capacitive sensing array 12 comprises 10 rows and 200 columns, whereas the linear capacitive sensing array 14 comprises 20 rows and 20 columns. Preferably, the linear sensing array 12 has a first resolution, and the linear sensing array 14 has a same resolution. Alternatively, the linear sensing array 12 has a first resolution, and the linear sensing array 14 has a second, other resolution. The same interleaving functionality as described for the imaging device of FIG. 1b is also performed by the device described in FIG. 1c. Here the larger images are interleaved with the help of the small images offset therefrom by other than an integer multiple of a line spacing, which allows for more accurate alignment of images. Therefore, increasing the number of sensing elements by 20% increases the resolution of the imaging device by 100%. The small images then serve as guide images in interleaving the large images.

In FIG. 1d, a simplified block diagram of an imaging device according to a third embodiment of the present invention is illustrated. The sensing pad 11 comprises a linear capacitive sensing array 12 and three small capacitive sensing arrays 14, 15 and 16. In this example, the linear capacitive sensing array comprises 10 rows and 200 columns, whereas each of the small linear capacitive sensing arrays comprises 20 rows and 20 columns. The first small linear capacitive sensing array 14 is spaced apart from the linear capacitive sensing array by a distance $\Delta_1=(N+\frac{1}{2})\cdot\delta_1$. Again, $\delta_1$ stands for the row spacing of the linear capacitive sensing device 12, and N is an integer. The second small linear capacitive sensing array 15 is spaced apart form the linear capacitive sensing array 12 by a distance $\Delta_2=(N+\frac{1}{4})\cdot\delta_1$, whereas the third small linear capacitive sensing array 16 is spaced apart by a distance $\Delta_3=(N+\frac{3}{4})\cdot\delta_1$. This way, through interleaving of the series of partial images retrieved by the imaging device, a four-fold increase in resolution is obtained, whereas the number of sensing elements is approximately doubled. Optionally, other arrangements of the sensing array and two or more small sensing arrays are envisaged.

In FIG. 2a, a simplified block diagram of an imaging device according a fourth preferred embodiment of the present invention is shown. The sensing pad 21 comprises a lower-resolution linear capacitive array 22 and a higher-resolution linear capacitive array 24. Here, the lower-resolution linear capacitive array 22 comprises 10 rows and 200 columns of capacitive sensing elements, whereas the higher-resolution linear capacitive array 24 comprises 40 rows and 40 columns of capacitive sensing elements. Additionally, each of the linear capacitive sensing arrays 22 and 24 is in communication with the processor for processing the image data provided from each of the linear capacitive arrays 22 and 24.

The size of the lower-resolution linear capacitive sensing array 22 is approximately 0.1×2 cm², whereas the size of the higher-resolution linear capacitive sensing array 24 is approximately 0.2×0.2 cm². Therefore, array 22 has a resolution of 10,000 S.E./cm², whereas array 24 has a resolution of 40,000 S.E/cm². (S.E.=sensing elements). The fact that the higher-resolution linear capacitive sensing array 24 has a resolution four times as high as the lower-resolution linear capacitive sensing array 22 enables one not only to perform interleaving of different images as described above, but also enables one to perform additional functionalities, which rely on high-resolution images. For example, pore print identification requires a resolution approximately four times as high as that used for conventional fingerprint analysis. Therefore, the device described in FIG. 2a is suitable for pore print analysis as well.

In use, an individual wishing to be authenticated swipes a predetermined biological surface, for instance a right thumb, over the sensing pad 21 in a direction normal to the linear capacitive arrays 22 and 24. This direction is referred to as longitudinal swipe direction. Typically, the longitudinal swipe direction is approximately equal to a longitudinal dimension of a digit to be scanned. The lower-resolution linear capacitive sensing array 22 captures a plurality of images across the fingertip. Approximately simultaneously the higher-resolution linear capacitive sensing array 24 captures a plurality of images across the fingertip. The processor merges each plurality of images to reconstruct a high-resolution image. Advantageously, the spatial relationship between a high-resolution image and a low-resolution image is known, since the placement of sensing elements in each array is precisely known. Optionally, the spacing $\Delta_4$ between the arrays 22 and 24 is a non-integer multiple of the row spacing $\delta_1$ of the first, lower-resolution array, $\Delta_4=(N+1/n)\cdot\delta_1$, where N and n are integers.

Figure 2B:
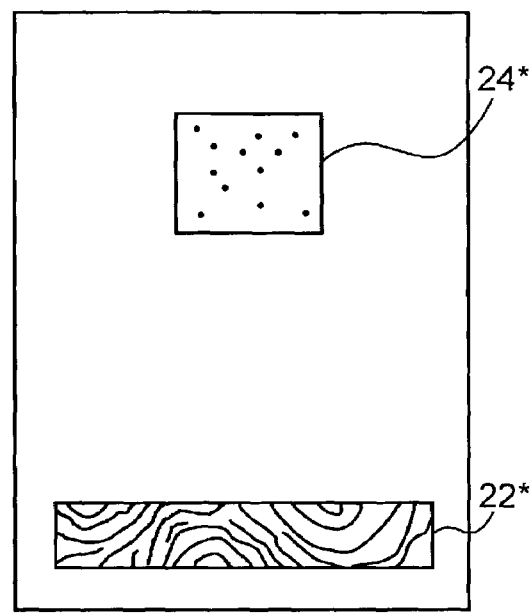

Referring now to FIG. 2b, optionally the lower-resolution array 22 is used to capture a first image 22*, for example the ridge-trough pattern of the fingertip, and the high-resolution array 24 is used to capture a second image 24*, for example pore print data. Advantageously, the spatial relationship between the high-resolution image 24* and the low-resolution image 22* is known. Thus, the lower-resolution image 22* can be used to simplify the comparison of the higher-resolution image 24* and a high-resolution template image by establishing the approximate location of the high-resolution image 24* across the fingertip and therefore within the template. Of course, the amount of processing required for matching the high-resolution image 24* with the higher-resolution template is greatly reduced. Optionally, the higher-resolution image 24* is compared to the high-resolution template image first, and the lower-resolution image 22* is used subsequently to verify correct user authentication. Further optionally, the lower resolution image is used to identify the user and a comparison of the higher resolution image with a template associated with the identified user is then used to substantiate the identification.

Figure 2C:
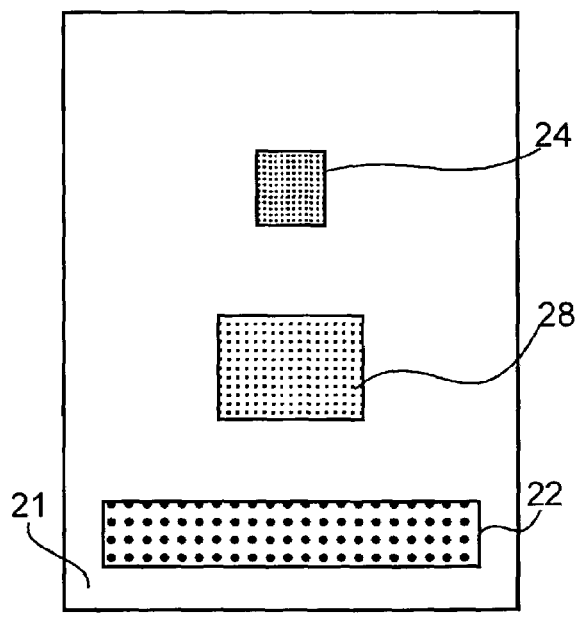
FIG. 2c is a simplified block diagram of a capacitive biometric sensing device featuring a sensing pad comprising three linear capacitive sensing arrays each having a different resolution.

FIG. 2c illustrates a simplified block diagram of an imaging device, according to a fifth preferred embodiment of the present invention. A sensing pad 21 comprises a higher-resolution linear capacitive sensing array 24, an intermediate-resolution linear capacitive sensing array 28, and a lower-resolution linear capacitive sensing array 22. The sensing pad 21 has an area of approximately 3×2 cm² for accepting a fingertip drawn across the sensing elements. For instance, the lower-resolution linear capacitive sensing array 22 comprises 5–10 rows and 200 columns of capacitive sensing elements, and the high-resolution sensing pad 24 comprises 20–40 rows and 50 columns of capacitive sensing elements. The intermediate-resolution sensing pad 28 comprises preferably 10–20 rows and 100 columns of capacitive sensing elements. The areas covered by the three linear capacitive sensing arrays are approximately 0.1×2 cm², 0.1×0.5 cm², and 0.1×1 cm², respectively, which results in maximum resolutions of 10,000 S.E./cm², 40,000 S.E./cm², and 20,000 S.E./cm², respectively. Additionally, each linear capacitive sensing array 22, 24, and 28 is in communication with the processor for processing the image data provided thereto from the arrays 22, 24, and 28.

The imaging device shown in FIG. 2c is well suited for capturing a complete image, corresponding to fingertips of arbitrary size. For example, if the user swipes a right thumb across the linear capacitive sensing array 22, 24, and 28, the system selects the image produced by the widest array 22, because array 22 is capable of imaging the entire biological surface with a single swipe, albeit at a lower resolution. Alternatively, if the user swipes a right little finger, the system may select the image captured by the narrowest array 24, because array 24 is capable of imaging the entire biological surface with a single swipe and advantageously provides a higher-resolution image than either of the arrays 22 and 28. Advantageously, the imaging device of FIG. 2c overcomes the problem of different fingers being of different size. As such, it is other than necessary to clip and scale the images prior to using a comparison algorithm. Further advantageously, the imaging device of FIG. 2c is well suited for imaging biological surfaces provided by adult users, adolescent users and even child users, the latter group of users typically excluded from identification with present day biometric identification systems due to their very small biological surfaces requiring high-resolution devices to image satisfactorily. Still further advantageously, if a finger is swiped off center of the sensing pad 21, typically a full image of the biological surface is capturable with the lower-resolution using array 22, and at least a partial image of the biological surface is captured approximately simultaneously with a higher resolution using one of the arrays 28 and 24. Of course, the spatial relationship across the finger between the lower-resolution image and the higher-resolution image is precisely known, allowing pore print analysis to be performed in addition to fingerprint analysis. This improves reliability when, for example, a core of the fingerprint fails to pass over the high resolution imager or where only a small part of a fingertip is accurately imaged.

The concepts developed in the previous paragraphs are illustrated for arrays, which are spaced apart by a non-integer multiple of the row spacing. Alternatively, the same concepts are applied to the column spacing, thus arranging different arrays with an offset of a non-integer multiple of the column spacing. This way, an increase in resolution not only in a direction essential parallel to a swipe direction of the biological surface, but also in a direction essential orthogonal to a swipe direction of the biological surface, is obtainable.

The swipe imagers described above require a finger to be moved in a known direction along the sensing pad. Unfortunately, it is not always convenient to do so. For example, when carrying a briefcase or speaking on the phone, it may be easier to move the finger one way, rather than another. Thus, a fingerprint imager that accepts fingerprints swiped in any direction is highly advantageous.

Figure 3A:
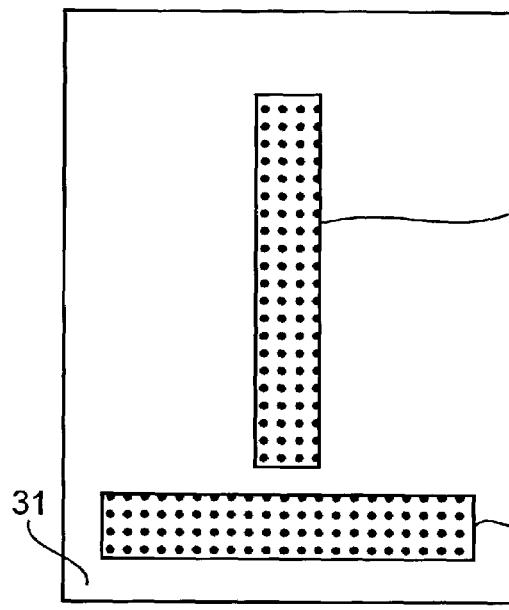
FIG. 3a is a simplified block diagram of a capacitive biometric sensing device featuring a multi-directional sensing pad comprising two linear capacitive sensing arrays arranged in a T shape.

Referring now to FIG. 3a, a simplified block diagram of an imaging device according to a sixth preferred embodiment of the present invention is shown, in which a sensing pad 31 comprises two linear capacitive sensing arrays 32 and 33. The first linear capacitive sensing array 32 comprises 10 rows and 200 columns, and forms a latitudinal linear capacitive sensing array. The second linear capacitive sensing array 33 comprises 200 rows and 10 columns, and forms a longitudinal linear capacitive sensing array. The array 33 is arranged in a way that its rows are parallel to the rows of array 32, and the array 33 is centered with respect to the array 32. Thus, the arrays 32 and 33 are arranged in a T-shape. The first longitudinal linear capacitive sensing array 31 images a fingertip moving back and forth in a longitudinal direction, while a fingertip moving side to side in a latitudinal direction is imaged by the second latitudinal linear capacitive sensing array 32. Of course, a fingertip moving in other directions is imaged by both the first and the second linear capacitive sensing arrays 31 and 32. In this way, the imaging device illustrated in FIG. 3a does not depend on a specific swiping direction of the biological surface to be scanned, in order to capture a sufficient amount of data for image reconstruction. This imaging device is therefore referred to as multi-directional sensing device.

Figure 3B:
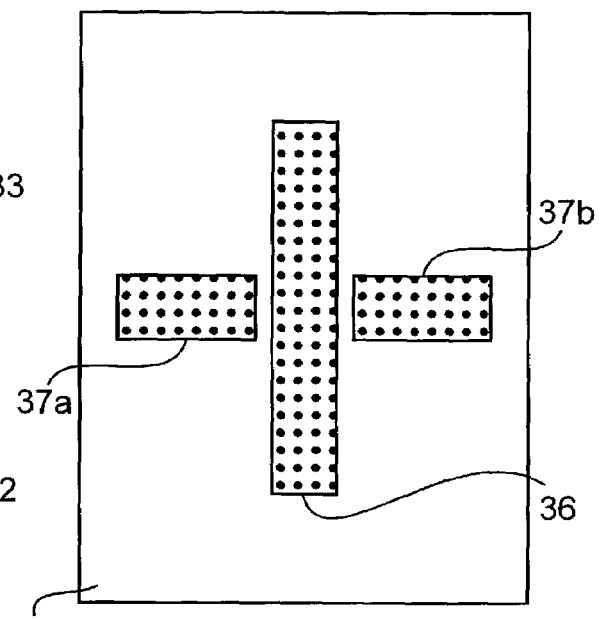
FIG. 3b is a simplified block diagram of a capacitive biometric sensing device featuring a multi-directional sensing pad comprising three linear capacitive sensing arrays arranged in a cross shape.

Referring now to FIG. 3b, a simplified block-diagram of a seventh preferred embodiment of the present invention illustrated. In the example as shown, the multidirectional sensing device is cross-shaped. The sensing pad 31 comprises a longitudinal linear capacitive sensing array 36, which comprises 200 rows and 10 columns of sensing elements. Adding two latitudinal linear capacitive sensing arrays 37a and 37b compensates the difference in resolution between a longitudinal and a latitudinal sweep across the linear capacitive sensing array 36. Advantageously, such an assembly of arrays allows scanning a biological surface with a high resolution regardless of the direction the biological surface is swiped. Preferably, the arrays have similar resolution in each of the two orthogonal directions—longitudinal and latitudinal.

Figure 3C:
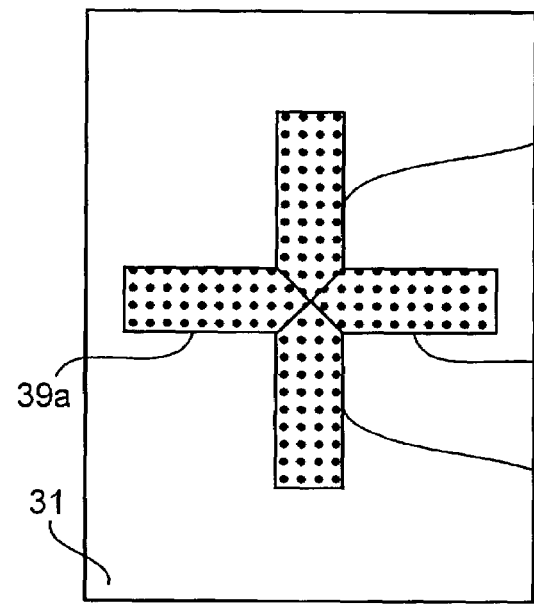
FIG. 3c is a simplified block diagram of a capacitive biometric sensing device featuring a multi directional sensing pad comprising four arrow-shaped linear capacitive sensing arrays arranged in a cross shape.

Another possibility to construct a multi-directional sensing device is illustrated in FIG. 3c, which shows a simplified block diagram of an imaging device according to an eighth preferred embodiment of the present invention. The sensing pad 31 comprises four linear capacitive sensing arrays. Two longitudinal arrays 38a and 38b are aligned along a common latitudinal direction, and two latitudinal sensing pads 39a and 39b are aligned along a common longitudinal direction. The four sensing pads have one straight end, and the other opposing end is arrow-shaped. All four arrow-shaped ends are adjacent. In the seventh embodiment of the present invention as illustrated in FIG. 3b, the resolution in the area of the sensing pad where the sensing arrays meet, is typically different for a latitudinal and for a longitudinal sweep. In the eighth embodiment of the present invention as shown in FIG. 3c, the arrow-shaped ends of the sensing arrays ensure an equal contribution of longitudinally as well as latitudinally oriented sensing arrays in the crossing area. Further, it allows for use of four identical imaging devices.

Figure 3D:
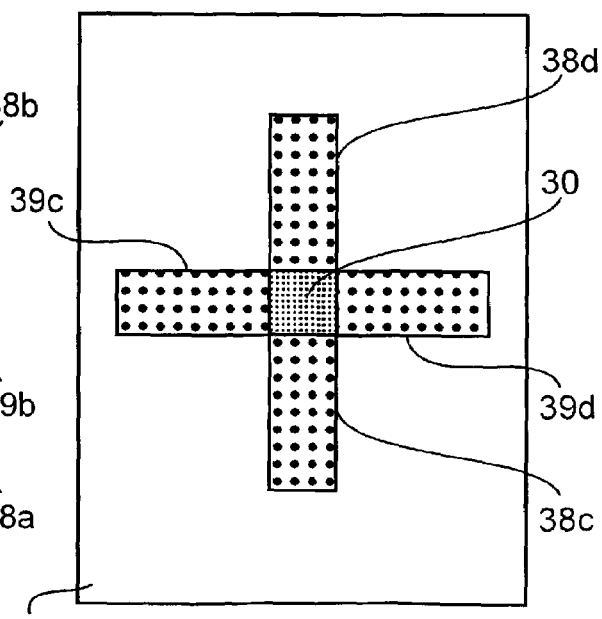
FIG. 3d is a simplified block diagram of a capacitive biometric sensing device featuring a multi directional sensing pad comprising five linear capacitive sensing arrays arranged in a cross shape.

Alternatively, in a ninth preferred embodiment of the present invention, as shown in FIG. 3d, the four linear capacitive sensing arrays 38c, 38d, 39c, and 39d have two straight ends, and a fifth linear capacitive sensing array 30 is disposed in the area enclosed by the four linear capacitive sensing arrays 38c, 38d, 39c, and 39d. Preferably, the fifth linear capacitive sensing array 30 provides a higher resolution area of the sensing device thereby supporting all of the advantages of the invention including interleaving, pore print imaging, multi-directional swipe imaging, and so forth.

Further alternatively, three or more than four linear capacitive sensing arrays are disposed in different directions to provide the advantages of the present invention. For example, the arrays could be arranged in the shape of a z,900, or in the shape of three angularly displaced sensors (not shown). In this latter case it is possible to provide each linear capacitive sensing array with a pointed end for interfacing with the other sensors or to provide a fourth different shaped linear capacitive sensing array disposed at the meeting point of the other three arrays.

Of course, the many individual linear capacitive sensing arrays not only allow for multi-directional sensing of a biological surface, but they optionally have individual resolutions, such as higher-resolution, intermediate-resolution, and lower-resolution. The different linear capacitive sensing arrays of different resolutions are then used for sensing different characteristics of the biological surface, as for example pore prints and fingerprint minutiae, which is done not in a one-directional, but in a multidirectional scan mode.

The above-described embodiments of the present invention make use of linear capacitive sensing arrays possibly insufficient in breadth to span a surface to be imaged and insufficient along an orthogonal dimension to image the entire surface for capturing an image of a fingerprint. This requires that the sensing pad sense and provide data at a rate to ensure that the data is correctly captured. It is often preferable to install a sensor that provides a separate data stream that informs the system of the relative motion of the fingertip along each axis of the linear capacitive sensing arrays. It is preferable to employ image analysis in conjunction with the motion sensor data to construct a composite image of the fingerprint as this allows for compensation for slip in the motion sensor.

Figure 4:
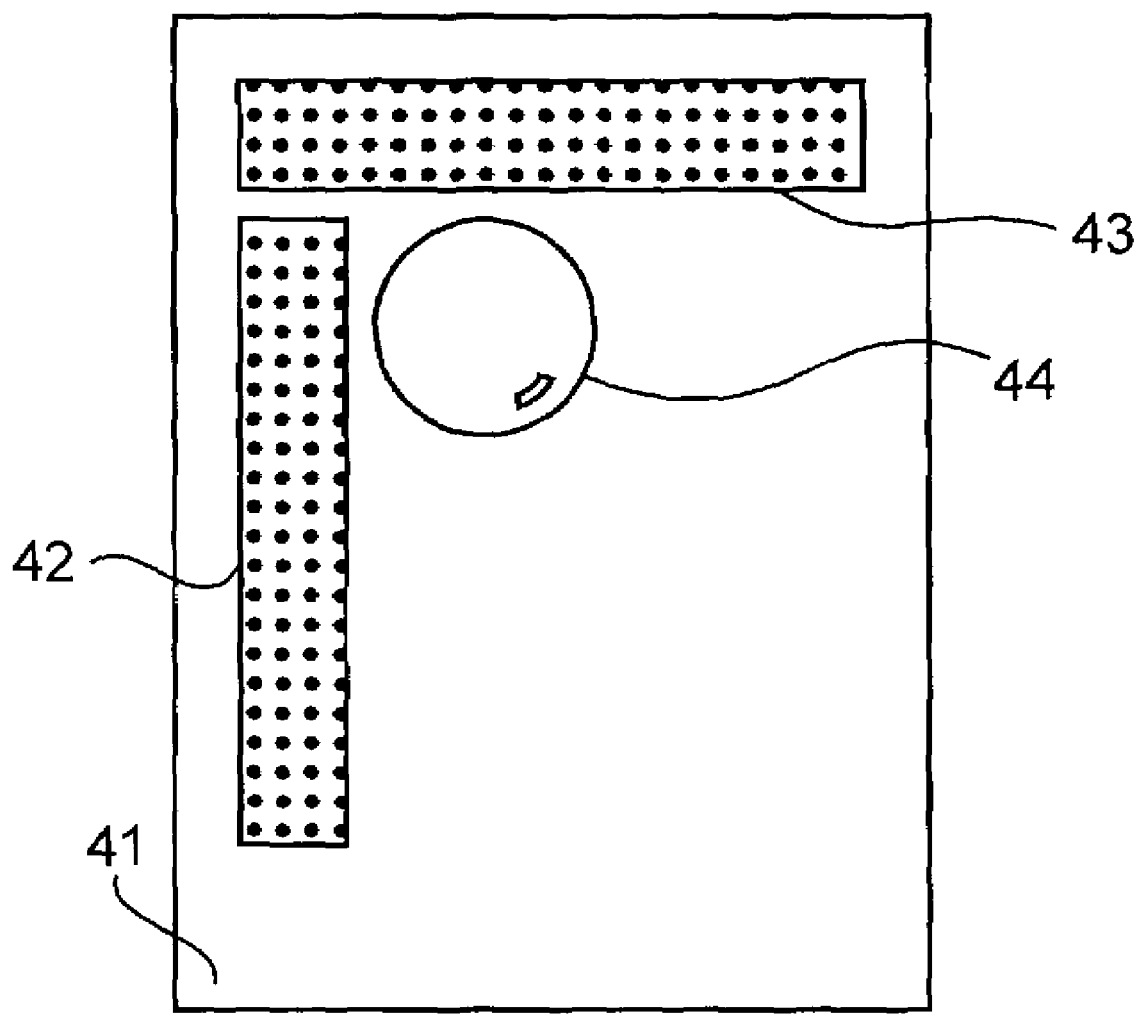
FIG. 4 is a simplified block diagram of a capacitive biometric sensing device featuring a multi directional sensing pad and a trackball operating as a motion sensor; and, FIG. 5, is a schematic drawing of the biometric sensing device featuring a sensing pad in communication with a processor.

A tenth embodiment of the present invention is now described with reference to FIG. 4. The sensing pad 41 comprises a first longitudinal linear capacitive sensing array 42 having 10 rows and 200 columns, and a second latitudinal linear capacitive sensing array 43 comprises 200 rows and 10 columns. The array 43 is arranged in a way that its rows are parallel to the rows of array 42, and the array 43 is aligned at one of the edges of the array 42. Thus, the two sensing arrays are arranged to substantially form a right angle. In this modification, a motion sensor in form of a track ball 44 is added to the overall system. The trackball 44 is connected to a processor for processing the motion data provided from the motion sensor. The motion sensor reduces an amount of redundant information that the sensing pad 41 captures, provides additional information for image construction, and allows for sensing of a moving surface regardless of direction or type of motion. Thus, for example, the linear capacitive sensing arrays do not begin capturing data until the motion sensor registers the motion of the fingertip. Once the finger motion is acknowledged, additional information from the motion sensor allows for determination of the speed at which the finger is moving across the imaging array and adjusting the imaging array data capture frequency accordingly.

The use of a motion sensor is not limited to the tenth embodiment of the present invention as described above, but is applicable to all of the previously described embodiments. In cases where two linear capacitive sensing arrays form an angle, the motion sensor in form of the trackball is preferably positioned close to where the two linear capacitive sensing arrays meet to form the angle. This way, movement of a biological surface to be scanned across any of the linear capacitive sensing arrays is monitored by the trackball.

Optionally, a plurality of trackballs is used for monitoring the motion of a biological surface moving across the sensing pad. Advantageously, when the sensing pad comprises more than one linear capacitive sensing array, the linear capacitive sensing arrays forming at least one substantially right angle, the trackballs are positioned in close vicinity to the at least one substantially right angle.

Figure 5:
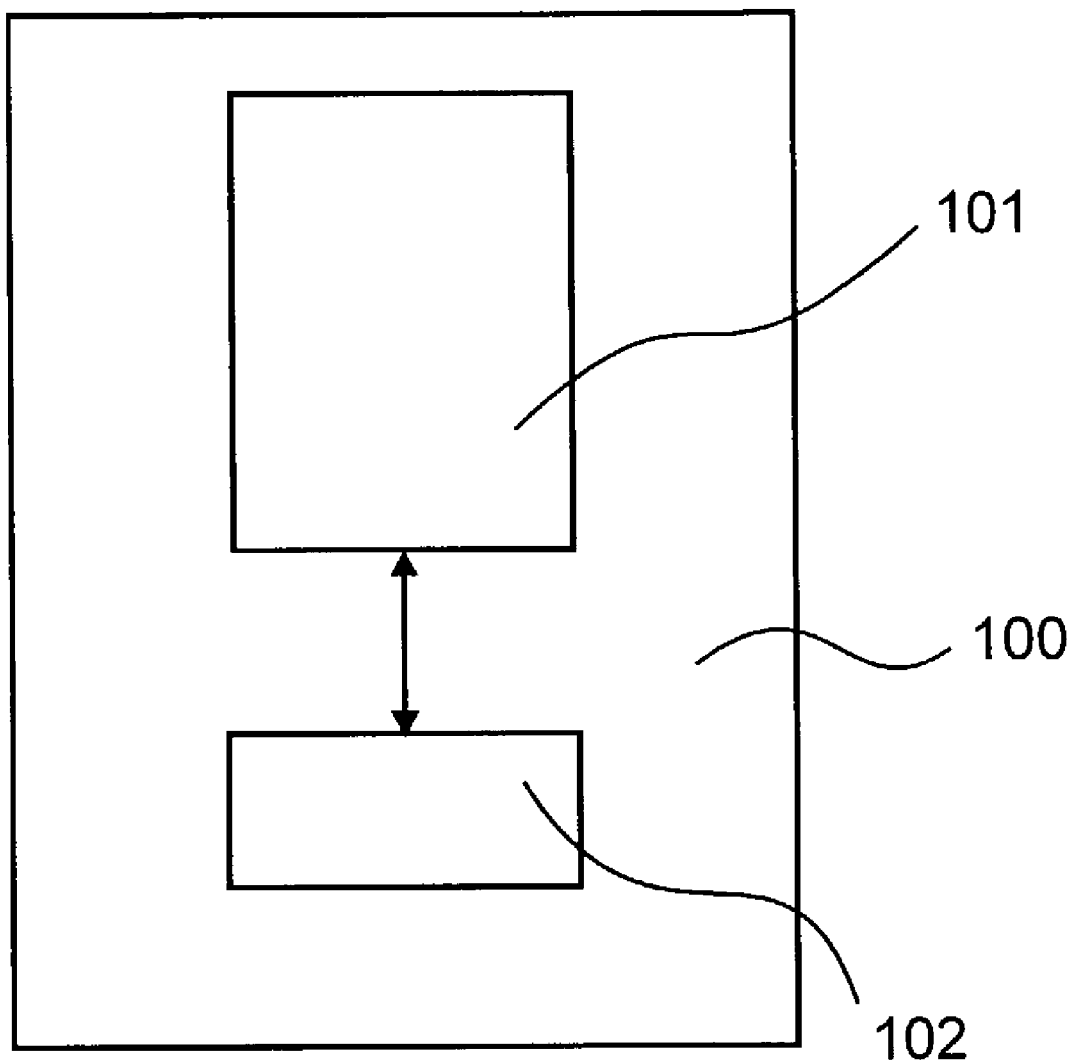

With reference to FIG. 5, a schematic drawing of a biometric sensing device 100 is shown. The biometric sensing device comprises a sensing pad 101 and a processor 102 in contact with the sensing pad 101. The sensing pad 101 is optionally one of the sensing pads described in the above-mentioned embodiments of the present invention, and the processor 102 is used for receiving and processing image data from the sensing pad 101. Optionally, the processor is used for receiving and processing motion data received from the sensing pad together with the image data received from the sensing pad.

Though the above description refers to capacitive swipe imagers, it is also applicable to optical swipe imagers, to temperature sensing swipe imagers and so forth. Though the present invention is described with reference to fingerprint imaging, it is equally applicable to other forms of swipe contact imaging.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

What is claimed is:

1. A biometric sensing device having a sensing pad for accepting a biological surface, said sensing pad having a plurality of sensing elements, said plurality of sensing elements forming sets of rows and sets of columns, said rows and said columns each having at least two sensing elements, each two of said rows and each two of said columns being individually spaced from each other, said rows and said columns grouped together to form linear sensing arrays, the biometric sensing device comprising:
   a first linear sensing array, the first linear sensing array being regularly spaced and having a first known spacing between rows thereof; and
   a second linear sensing array, the second linear sensing array being regularly spaced and having a second known spacing between rows thereof;
   wherein the first and second regularly spaced linear sensing arrays are separated by a third spacing that is other than an integer multiple of the first known spacing whereby interleaving of images from said first and second linear arrays during image reconstruction of a sensed biometric surface increases the resolution of a resultant interleaved image compared to the resolution of images provided independently by said first and second linear arrays.

2. A biometric sensing device as defined in claim 1, wherein the first linear sensing array and the second linear sensing array are disposed other than in parallel along a longitudinal axis thereof and form a sensing pad for accepting the biological surface and for sensing the biological surface as the biological surface is moved across said sensing pad in a direction being substantially a linear combination of normal directions of the first and second sensing arrays, where a normal direction of each linear sensing array is substantially orthogonal to a longitudinal extension of each said linear sensing array.

3. A biometric sensing device as defined in claim 1, wherein a resolution of the second linear sensing array is the same as a resolution of the first linear sensing array.

4. A biometric sensing device as defined in claim 1, wherein a resolution of the second linear sensing array is different from a resolution of the first linear sensing array.

5. A biometric sensing device as defined in claim 4, wherein the linear sensing arrays with different resolution are linear sensing arrays having resolution for sensing different features of the biological surface, said features having smallest distinguishable features of different size.

6. A biometric sensing device as defined in claim 1, wherein the plurality of sensing elements comprise a plurality of capacitive sensing elements.

7. A biometric sensing device as defined in claim 1, wherein the plurality of sensing elements comprise a plurality of optical sensing elements.

8. A biometric sensing device as defined in claim 1, wherein the plurality of sensing elements comprise a plurality of thermal sensing elements.

9. A biometric sensing device as defined in claim 1, comprising:
   a processor for interleaving images sensed by the second sensing array using images sensed by the first sensing array as guiding images.

10. A biometric sensing device as defined in claim 1, comprising:
   a third linear sensing array, the third linear sensing array being regularly spaced;
   wherein the first and third regularly spaced linear sensing arrays are separated by a fourth spacing that is other than an integer multiple of the first known spacing; and
   wherein the second and third regularly spaced linear sensing arrays are separated by a fifth spacing that is other than an integer multiple of the first known spacing.

11. A biometric sensing device as defined in claim 10, wherein the resolution of the third linear sensing array is higher than the resolution of the second linear sensing array, and wherein the resolution of the second linear sensing array is higher than the resolution of the first linear sensing array.

12. A biometric sensing device as defined in claim 1, comprising a processor for receiving image data from the sensing pad and for processing the received image data to form a composite image of the biological surface from the image data.

13. A biometric sensing device as defined in claim 1, comprising at least one motion sensor that monitors motion of the biological surface when moved across the at least one motion sensor.

14. A biometric sensing device as defined in claim 13, comprising a processor for receiving motion data from the motion sensor and processing said motion data.

15. A biometric sensing device as defined in claim 14, wherein a processor for receiving image data from the sensing pad and for processing said image data is the same processor for receiving motion data from the motion sensor and processing said motion data.

16. A biometric sensing device as defined in claim 13, wherein the at least one motion sensor is a trackball.

17. A multi-directional biometric sensing device having a sensing pad for accepting a biological surface, said sensing pad having a plurality of sensing elements, said plurality of sensing elements forming sets of rows and sets of columns, each of said rows and each of said columns being individually spaced and including at least two sensing elements, said rows and said columns grouped together to form linear sensing arrays, the biometric sensing device comprising:
   a first linear sensing array for extending across a width of a biological surface when disposed perpendicular thereto; and
   a second linear sensing array disposed with respect to the first linear sensing array so as to provide longitudinal and latitudinal scanning of the biological surface as the biological surface is moved over said first and second linear sensing arrays in one of at least two scanning directions.

18. A biometric sensing device as defined in claim 17, wherein the first linear sensing array and the second linear sensing array are disposed other than in parallel along a longitudinal axis thereof and form a sensing pad for accepting a biological surface and for sensing a biological surface as the biological surface is moved across said sensing pad in a direction being substantially a linear combination of normal directions of the first and second linear sensing arrays, where a normal direction of each linear sensing array is substantially orthogonal to a longitudinal extension of each said linear sensing array.

19. A biometric sensing device as defined in claim 17, wherein the plurality of sensing elements comprise a plurality of capacitive sensing elements.

20. A biometric sensing device as defined in claim 17, wherein the plurality of sensing elements comprise a plurality of optical sensing elements.

21. A biometric sensing device as defined in claim 17, wherein the plurality of sensing elements comprise a plurality of thermal sensing elements.

22. A biometric sensing device as defined in claim 17, comprising a processor for receiving image data from the sensing pad and for processing the received image data to form a composite image of the biological surface from the image data.

23. A biometric sensing device as defined in claim 17, comprising at least one motion sensor that monitors motion of the biological surface when moved across the at least one motion sensor.

24. A biometric sensing device as defined in claim 23, comprising a processor for receiving motion data from the motion sensor and processing said data.

25. A biometric sensing device as defined in claim 24, wherein the processor for receiving image data from the sensing pad and for processing said image data is the same processor for receiving motion data from the motion sensor and processing said motion data.

26. A biometric sensing device as defined in claim 23, wherein the at least one motion sensor is a trackball.

27. A method for sensing a biological surface comprising the steps of:
   moving a biological surface across a sensing pad in any swiping direction;
   sensing a first plurality of partial images of the swiped biological surface using a first linear sensing array;
   sensing a second plurality of partial images of the swiped biological surface using a second linear sensing array that is substantially perpendicular to said first linear sensing array;
   constructing an image of the biological surface from the pluralities of partial images from said first and second linear sensing arrays using a processor; and
   comparing the constructed image of the biological surface with a template image.

28. A method for sensing a biological surface as defined in claim 27, comprising the steps of:
   moving the biological surface across the sensing pad in a direction that is substantially a linear combination of normal directions of said first and second linear sensing arrays, where a normal direction of each sensing array is substantially orthogonal to a longitudinal extension of each said sensing array.

29. A method for sensing a biological surface as defined in claim 27, comprising the steps of:
   sensing the motion of the biological surface using a motion sensor; and
   constructing an image of the biological surface from the pluralities of partial images and motion data from the motion sensor using said processor.

30. A method for sensing a biological surface as defined in claim 27, comprising the steps of:
   sensing a first plurality of partial images of a first detail of a biological surface using the first linear sensing array;
   constructing an image of a first detail of the biological surface from the first plurality of partial images using the processor;
   sensing a second plurality of partial images of a second detail of the biological surface using the second linear sensing array;
   constructing an image of a second detail of the biological surface from the second plurality of partial images using the processor;
   aligning the images of the details of the biological surface with a template image using the image of the first detail of the biological surface; and
   comparing the aligned image of the second detail of the biological surface with a template image.

* * * * *

UNITED STATES PATENT AND TRADEMARK OFFICE
CERTIFICATE OF CORRECTION

| | | |
|---|---|---|
| PATENT NO. | : 7,043,061 B2 | Page 1 of 1 |
| APPLICATION NO. | : 10/155005 | |
| DATED | : May 9, 2006 | |
| INVENTOR(S) | : Laurence Hamid et al. | |

It is certified that error appears in the above-identified patent and that said Letters Patent is hereby corrected as shown below:

<u>Column 3,</u>
Line 49, delete "posses" and insert -- possess --.

<u>Column 11,</u>
Line 48, delete "z,900 ," and insert -- C, --.

Signed and Sealed this

Third Day of April, 2007

JON W. DUDAS
*Director of the United States Patent and Trademark Office*